United States Patent
Ono et al.

(10) Patent No.: US 8,585,216 B2
(45) Date of Patent: Nov. 19, 2013

(54) VIDEO PROJECTOR WHICH OBLIQUELY PROJECTS IMAGES ONTO SCREEN

(75) Inventors: Chohei Ono, Yokohama (JP); Naoyuki Ogura, Machida (JP); Koji Hirata, Yokohama (JP); Masahiko Yatsu, Fujisawa (JP); Masayuki Fukui, Yokohama (JP); Megumi Kurachi, Warabi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 573 days.

(21) Appl. No.: 12/793,500

(22) Filed: Jun. 3, 2010

(65) Prior Publication Data

US 2011/0075115 A1 Mar. 31, 2011

(30) Foreign Application Priority Data

Sep. 28, 2009 (JP) .................................. 2009-222617

(51) Int. Cl.
*G03B 21/28* (2006.01)

(52) U.S. Cl.
USPC .......................................................... 353/98

(58) Field of Classification Search
USPC ............................................ 353/98, 119, 122
See application file for complete search history.

(56) References Cited

U.S. PATENT DOCUMENTS

2007/0097337 A1*  5/2007  Morikuni et al. ................ 353/99
2008/0212038 A1*  9/2008  Hirata et al. .................... 353/70

FOREIGN PATENT DOCUMENTS

| JP | 2006-259252 A |   | 9/2006 |
| JP | 2006259252 A | * | 9/2006 |

* cited by examiner

*Primary Examiner* — Georgia Y Epps
*Assistant Examiner* — Danell L Owens
(74) *Attorney, Agent, or Firm* — Kilpatrick Townsend & Stockton LLP

(57) ABSTRACT

An object of the invention is to reduce the size and weight of a video projector by shortening the length of the arm of a mirror rotator and reducing the size of a mirror. A video projector comprises a plurality of projection lenses through which image light rays from a liquid crystal panel are extracted in a magnified manner; a reflective mirror for reflecting the extracted image light rays onto a screen; and a mirror rotator for rotating the reflective mirror so that the extracted image light rays can be reflected in particular directions. Among the projection lenses, some of the projection lenses located farther away from the liquid crystal penal are partially cut such that areas through which the image light rays do not pass are cut off to create a lens cut-off space. The mirror rotator is placed in the lens cut-off space.

8 Claims, 3 Drawing Sheets

VIDEO PROJECTOR WHICH OBLIQUELY PROJECTS IMAGES ONTO SCREEN

CLAIM OF PRIORITY

The present application claims priority from Japanese Patent Application No. 2009-222617, filed on Sep. 28, 2009, the content of which is hereby incorporated by reference into this application.

BACKGROUND OF THE INVENTION

1. Field of the Invention

The present invention relates to a video projector that obliquely projects images formed in its image display element (e.g., liquid crystal panel) onto a projection screen or board, thereby displaying the images in a magnified manner.

2. Description of the Related Art

Such a video projector is required to project an adequately magnified image on a screen, and what is particularly required are that the shadow of the user should not be projected on the screen and that the user should be able to avoid directly seeing image light rays from the projector. For this reason, video projectors are now manufactured, which require a shorter distance to a screen. The optical projection system of such a video projector is designed such that image light rays are obliquely projected onto a screen. Another known video projector achieves a short projection distance by employing rear projection in which a reflective mirror is arranged between the image display element of the projector and a screen.

An example of such a projector with a short projection distance is the one disclosed in Japanese Unexamined Patent Application Publication No. 2006-259252. This projector has a reflective mirror for reflecting image light rays from its projection lenses and a mirror support mechanism for supporting and rotating the reflective mirror. The projector is fixed to the mirror support mechanism such that image light rays from the projector are incident on the reflective mirror at particular angles. When front projection is employed, the projector is housed or covered by the mirror support mechanism.

SUMMARY OF THE INVENTION

Projectors that involve the use of a reflective mirror, such as the one in Japanese Unexamined Patent Application Publication No. 2006-259252, are disadvantageous in the following respects. When a video projector is designed to have a mirror support mechanism for supporting and rotating a reflective mirror, the mirror support mechanism (including a rotary shaft) is often placed at a lower position of the projector and often includes an arm to support the reflective mirror. During image projection, the mirror support mechanism positions the mirror in front of a projection lens such that the mirror faces the lens at a particular angle. To close the mirror or place the mirror over the housing of the projector, then, the length of the arm needs to be at least greater than the height of the housing so that the mirror can be placed properly over the housing. Thus, the length of the arm has a lower limit, and so do the distance from the projection lens to the mirror and the size of the mirror. Because of this, it has been quite difficult to reduce the size and weight of a video projector. Reducing the required torque for rotating the mirror has also been difficult because of the difficulty in reducing the mirror size.

In view of the above problems, an object of the invention is thus to reduce the size and weight of a video projector by shortening the length of the arm of a mirror rotator and reducing the size of a mirror.

In one aspect, the invention is a video projector for obliquely projecting images onto a screen to display the images in a magnified manner, the projector comprising: an image display element for forming images; a plurality of projection lenses through which image light rays from the image display element are extracted in a magnified manner; a reflective mirror for reflecting the extracted image light rays onto the screen; a mirror rotator for rotating the reflective mirror so that the extracted image light rays can be reflected in particular directions; and a housing for housing the image display element, the projection lenses, and the mirror rotator, wherein among the projection lenses, some of the projection lenses located farther away from the image display element are partially cut such that areas through which the image light rays from the image display element do not pass are cut off to create a lens cut-off space, and wherein the mirror rotator is placed in the lens cut-off space.

The above video projector further comprises a mirror support plate for supporting the reflective mirror; and an arm for connecting the mirror support plate to a rotary shaft of the mirror rotator, wherein the rotary shaft is placed in the lens cut-off space.

In the above video projector, the lower halves of some of the projection lenses located farther away from the image display element are cut off to create the lens cut-off space, and the partially-cut projection lenses each have a rectangular shape with substantially the same aspect ratio as that of the image display element or a trapezoidal shape that matches an area through which the image light rays from the image display element pass.

In accordance with the invention, the size and weight of a video projector can be reduced by the length of the arm of a mirror rotator being reduced and the size of a mirror being reduced.

BRIEF DESCRIPTION OF THE DRAWINGS

These and other features, objects, and advantages of the present invention will become more apparent from the following description when taken in conjunction with the accompanying drawings wherein.

DETAILED DESCRIPTION OF THE EMBODIMENT

Figure 1A:
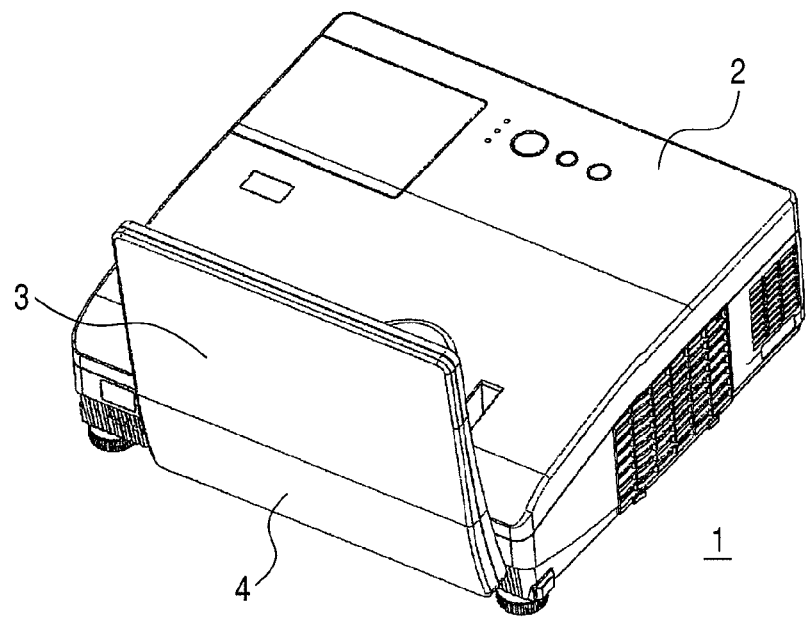
FIG. 1A is a perspective view of a video projector according to an embodiment of the invention, illustrating the state of the projector when its reflective mirror is open.
Figure 1B:
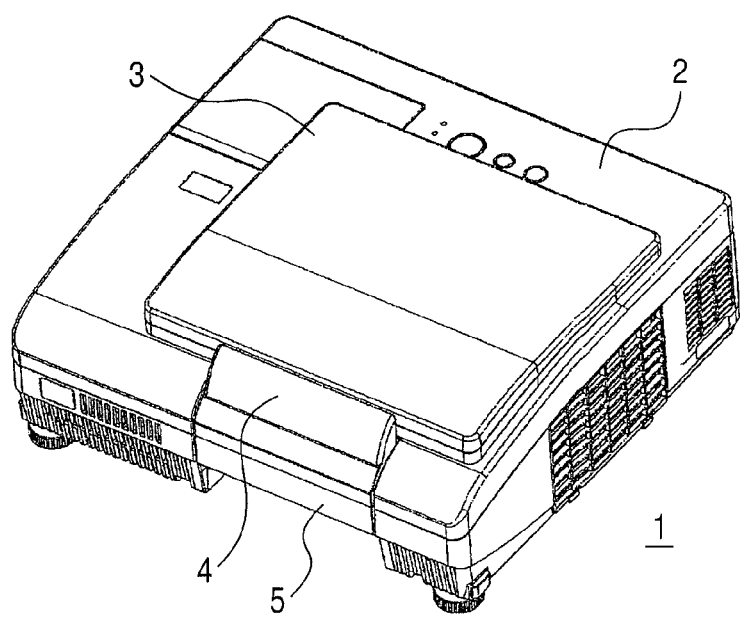
FIG. 1B is another perspective view of the video projector, illustrating its state when the reflective mirror is closed.

FIGS. 1A and 1B are perspective views of a video projector according to an embodiment of the invention. FIG. 1A illustrates the state of the projector when its reflective mirror is open, and FIG. 1B illustrates its state when the reflective mirror is closed.

The video projector 1 of FIGS. 1A and 1B uses the reflective mirror to obliquely project images formed in its image display element (e.g., a reflective or transmissive liquid crystal panel) onto a projection screen or board, thereby displaying the images in a magnified manner. The image display element can be a micro-mirror device in which multiple micro-mirrors are arrayed (e.g., Digital Micromirror Device: trademark of Texas Instruments, Inc.). A housing 2 houses main components such as an optical projection system, an optical illumination system, and circuitry components. Attached to the top side of the housing 2 is a mirror support plate 3 that supports the reflective mirror. The mirror support plate 3 is secured to the housing 2 via an arm 4, and a mirror rotator 5 allows the mirror support plate 3 to be opened or closed with respect to the housing 2.

Figure 2A:
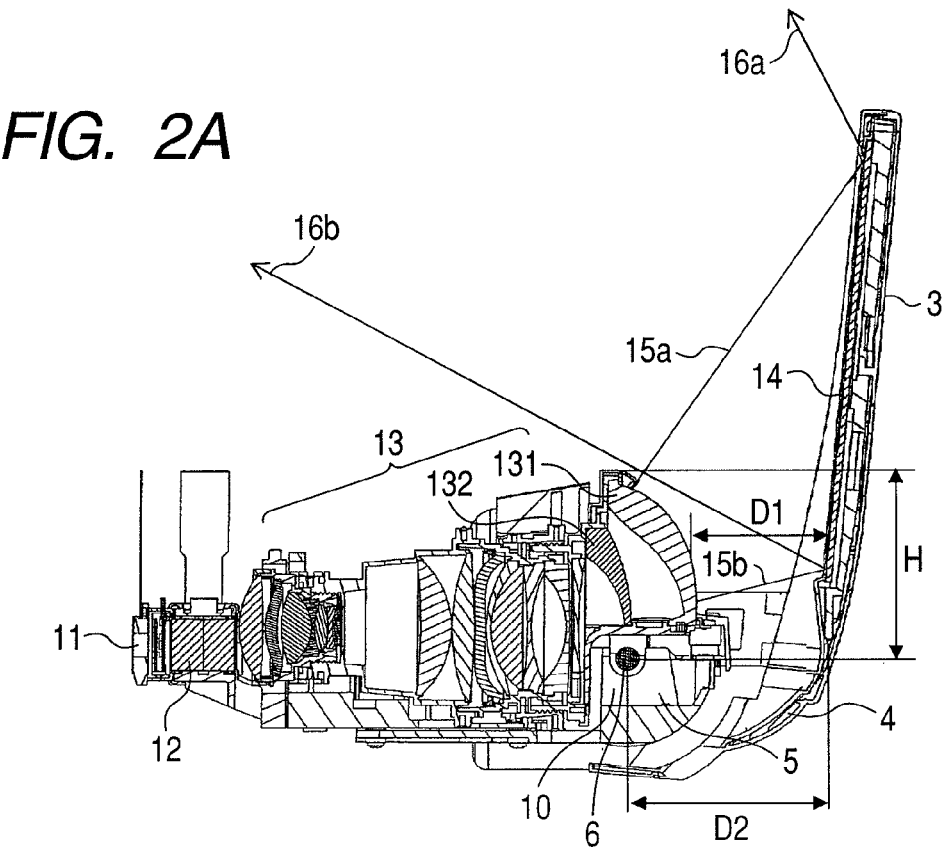
FIG. 2A is a cross-section illustrating the internal configuration of the video projector with the reflective mirror open.
Figure 2B:
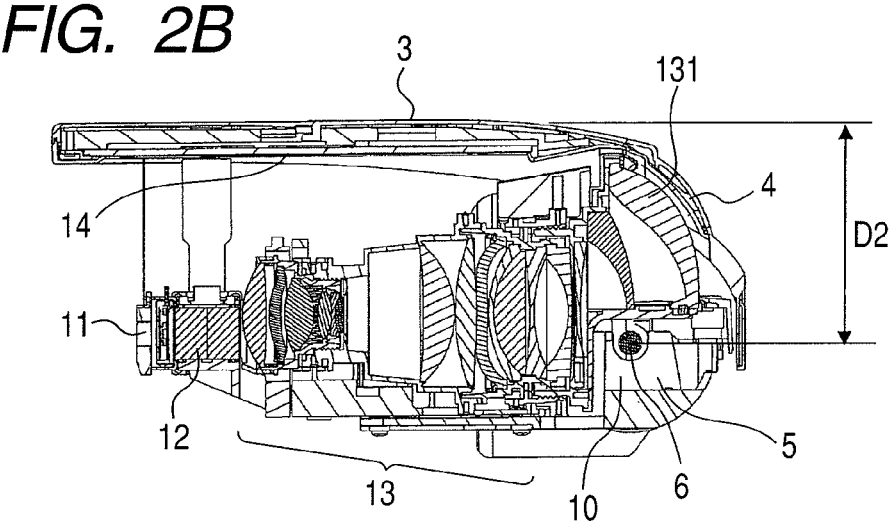
FIG. 2B is a cross-section illustrating the internal configuration of the video projector with the reflective mirror closed.

FIGS. 2A and 2B are cross-sections illustrating the internal configuration of the video projector 1. FIG. 2A illustrates its state when the reflective mirror is open, and FIG. 2B illustrates its state when the reflective mirror is closed. The housing 2 is not illustrated in those figures.

The optical projection system of the video projector 1 includes the following components: a light source (not illustrated); a liquid crystal panel 11 (display panel); a cross-prism 12; multiple projection lenses 13; and a reflective mirror 14. In FIGS. 2A and 2B, the projection lens located farthest away from the liquid crystal panel 11 is indicated by reference numeral 131, and the second farthest lens is indicated by reference numeral 132. Image light rays 15a to 15b are extracted from the projection lens 131 and directed toward the reflective mirror 14, where they are reflected as illustrated to be reflected light rays 16a to 16b. The reflected light rays 16a to 16b are thus projected obliquely onto a projection screen (not illustrated). The reflective mirror 14 is supported by the mirror support plate 3. The mirror rotator 5 rotates around a rotary shaft 6 with the aid of a motor and a row of gears, thereby rotating the arm 4 (including the reflective mirror 14). The mirror rotator 5 allows for adjustment of the angle of the reflective mirror 14 so that the reflected light rays 16a-16b can be projected in particular directions.

As will be discussed later more in detail, the projection lenses 13 are different in shape and arranged on an optical axis 20 (see FIG. 3) at different intervals so that image distortions resulting from the oblique projection can be corrected. In addition, the projection lenses 131 and 132 are partially cut. Specifically, the lower halves of the lenses 131 and 132 (i.e., the areas through which the light rays 15a-15b do not pass) are cut off. The use of the partially-cut lenses 131 and 132 results in a space 10 inside the housing 2 (see FIG. 3).

The use of the reflective mirror 14 for indirect (or reflective) projection greatly reduces the projection distance between the video projector 1 and a screen because the reflective mirror 14 can reflect image light rays and obliquely project them onto the screen. Moreover, the position of an image projected on the screen can be set as desired by the mirror rotator 5 adjusting the angle of the reflective mirror 14. The size of the reflective mirror 14 (i.e., its reflection area) is determined by the width of the image light rays 15a to 15b extracted from the projection lens 131. In other words, the size of the reflective mirror 14 needs to be increased in proportion to the distance D1 between the projection lens 131 and the reflective mirror 14. Therefore, the larger the distance D1, the larger the size of the video projector 1.

In the video projector 1 of the present embodiment, the distance D1 between the projection lens 131 and the reflective mirror 14 is thus made small so that the size of the reflective mirror 14 can also be small. Shortening the distance D1 requires shortening the length D2 of the arm 4 (i.e., the distance between the rotary shaft 6 and the lower end of the mirror support plate 3). If the length D2 is shortened excessively, however, the reflective mirror 14 may not be placed over the top surface of the housing 2 when the reflective mirror 14 is to be closed (see FIG. 2B). Thus, the length D2 of the arm 4 needs to be equal to a height H so that the reflective mirror 14 can be placed over the projection lenses 13 or the top surface of the housing 2. In the present embodiment, therefore, the mirror rotator 5 and the rotary shaft 6 are placed in the aforementioned space 10, and the length D2 of the arm 4 is made substantially equal to the height H between the rotary shaft 6 and the top surface of the housing 2 so that the arm 4 allows the reflective mirror 14 to be placed over the projection lenses 13. This reduces the distance D1 between the projection lens 131 and the reflective mirror 14 and greatly reduces the size of the reflective mirror 14 (i.e., its reflection area) as well.

With the above configuration, the length of the video projector 1 is reduced to 303 mm, which is smaller by 40 mm than the length of a video projector in which the rotary shaft 6 is placed in front of the liquid crystal panel 11. The height of the video projector 1 is also reduced to 118 mm, which is smaller by 35 mm than the height of a video projector in which the rotary shaft 6 is placed below or above the projection lenses 13.

Figure 3:
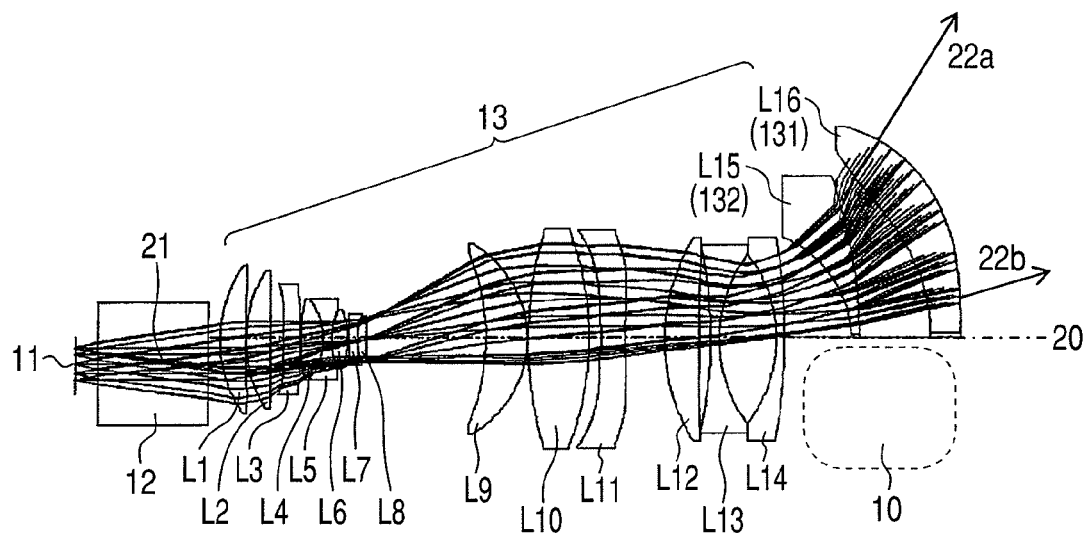
FIG. 3 is a cross-section of the optical projection system of the video projector, illustrating the configuration of lenses and the trajectories of light rays.

FIG. 3 is a cross-section of the optical projection system according to the present embodiment, illustrating the configuration of the lenses 13 and the trajectories of image light rays.

As stated above, the optical projection system comprises the liquid crystal panel 11, the cross-prism 12, the projection lenses 13, and the like. As illustrated in FIG. 3, the projection lenses 13 have sixteen lenses indicated by reference numerals from L1 to L16. The lenses L3, L11, L15, and L16 are aspherical plastic lenses. The lenses L15 and L16 correspond to the lenses 132 and 131, respectively, of FIG. 2A. For the purpose of achieving oblique projection, the optical axis 20 on which the lenses 13 (L1 to L16) are arranged is located above the center of image light rays 21 that are extracted from the liquid crystal panel 11 via the cross-prism 12. The lens L16, farthest from the liquid crystal panel 11, corrects keystone (trapezoid) image distortions resulting from oblique projection and optical aberrations resulting from the spread of the light rays 21.

As illustrated by the trajectories of the light rays 21 in FIG. 3, the light rays 21 are extracted from the cross-prism 12 and gradually directed upward thereafter. At the lenses L15 (132) and L16 (131), almost all of the light rays 21 pass above the optical axis 20. In other words, the areas of the lenses L15 and L16 through which the light rays 21 pass are the upper halves of the lenses L15 and L16, which are located above the optical axis 20, and the lower halves of the lenses L15 and L16 (not illustrated) through which the light rays 21 do not pass are thus unnecessary and cut off. As stated above, the mirror rotator 5 and rotary shaft 6 are placed in the space 10 that results from the use of those partially-cut lenses L15 and L16. The lenses L15 and L16 each have a rectangular shape with substantially the same aspect ratio as that of the liquid crystal panel 11 or a trapezoidal shape that matches an area through which the light rays 21 pass. Those shapes of the lenses L15 and L16 are advantages in blocking some of the light rays 21 that adversely affect the focusing properties of the lenses L15 and L16.

The above lens configuration of the present embodiment is only meant to be an example, and so are the number and shapes of the lenses L1 to L16. While only the lenses L15 and L16 are partially cut, the invention is of course not limited thereto. For example, it is also possible to cut off areas through which the light rays 21 do not pass from the lenses L9 to L14. In that case, the space 10 can be expanded, so that the mirror rotator 5 and the rotary shaft 6 can be housed more easily, and the size of the video projector 1 can also be reduced further.

As stated above, the present embodiment allows the use of a short arm and a small reflective mirror because the mirror rotator 5 and the rotary shaft 6 can be placed in the space 10 that results from the use of the partially-cut projection lenses L15 and L16. As a result, the video projector 1 is smaller and lighter than conventional video projectors. When the reflective mirror 14 is to be rotated electrically, the required torque for rotating the reflective mirror 14 can be reduced by using lighter rotary components and the short arm; hence, the mirror rotator 5 is less costly.

Figure 4:
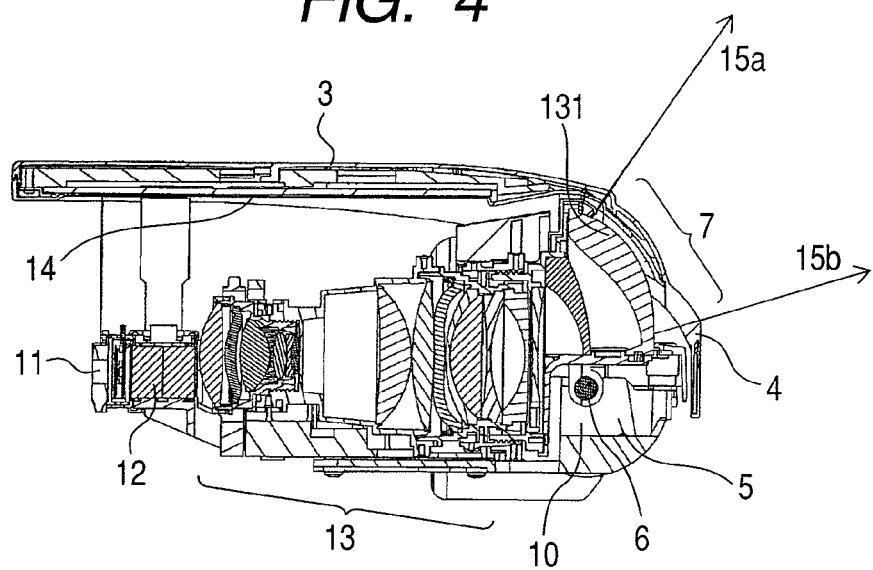
FIG. 4 is a cross-section of a video projector according to another embodiment of the invention (direct projection mode).

FIG. 4 is a cross-section of a video projector according to another embodiment of the invention. This embodiment employs direct projection mode, as opposed to the above-described indirect (reflective) projection mode. Specifically, images are directly projected on a screen without the use of the reflective mirror 14, which is now placed over the housing 2 as illustrated also in FIGS. 1B and 2B. To achieve the direct projection mode, the arm 4 has an opening 7 so that the image light rays 15a-15b extracted from the projection lens 131 pass through the opening 7. The lens configuration of the optical projection system is the same as in FIG. 2B.

The present embodiment thus allows the use of the two projection modes, that is, the direct projection mode and the indirect (reflective) projection mode, by closing or opening the reflective mirror 14. Thus, the user can switch between the two modes as desired, which increases the convenience of the video projector.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A video projector for obliquely projecting images onto a screen to display the images in a magnified manner, the projector comprising:
   an image display element for forming images;
   a plurality of projection lenses through which image light rays from the image display element are extracted in a magnified manner;
   a reflective mirror for reflecting the extracted image light rays onto the screen;
   a mirror rotator for rotating the reflective mirror so that the extracted image light rays can be reflected in particular directions; and
   a housing for housing the image display element, the projection lenses, and the mirror rotator,
   wherein among the projection lenses, some of the projection lenses located farther away from the image display element are partially cut such that areas through which the image light rays from the image display element do not pass are cut off to create a lens cut-off space, and
   wherein the mirror rotator is fixed in the lens cut-off space.

2. The video projector according to claim 1, further comprising:
   a mirror support plate for supporting the reflective mirror; and
   an arm for connecting the mirror support plate to a rotary shaft of the mirror rotator,
   wherein the rotary shaft is placed in the lens cutoff space.

3. The video projector according to claim 2,
   wherein the mirror rotator places the reflective mirror over the housing of the video projector by rotating the reflective mirror, and
   wherein the length of the arm is substantially equal to the distance between the rotary shaft and a top surface of the housing.

4. The video projector according to claim 3,
   wherein the arm has an opening through which the image light rays extracted from the projection lenses pass, and
   wherein the image light rays extracted from the projection lenses are directly projected onto the screen through the opening with the reflective mirror placed over the housing.

5. The video projector according to claim 1,
   wherein the lower halves of some of the projection lenses located farther away from the image display element are cut off to create the lens cut-off space, and
   wherein the partially-cut projection lenses each have a rectangular shape with substantially the same aspect ratio as that of the image display element or a trapezoidal shape that matches an area through which the image light rays from the image display element pass.

6. The video projector according to claim 2,
   wherein the lower halves of some of the projection lenses located farther away from the image display element are cut off to create the lens cut-off space, and
   wherein the partially-cut projection lenses each have a rectangular shape with substantially the same aspect ratio as that of the image display element or a trapezoidal shape that matches an area through which the image light rays from the image display element pass.

7. The video projector according to claim 3,
   wherein the lower halves of some of the projection lenses located farther away from the image display element are cut off to create the lens cut-off space, and
   wherein the partially-cut projection lenses each have a rectangular shape with substantially the same aspect ratio as that of the image display element or a trapezoidal shape that matches an area through which the image light rays from the image display element pass.

8. The video projector according to claim 4,
   wherein the lower halves of some of the projection lenses located farther away from the image display element are cut off to create the lens cut-off space, and
   wherein the partially-cut projection lenses each have a rectangular shape with substantially the same aspect ratio as that of the image display element or a trapezoidal shape that matches an area through which the image light rays from the image display element pass.

* * * * *